(12) United States Patent
Wu et al.

(10) Patent No.: US 8,514,177 B2
(45) Date of Patent: Aug. 20, 2013

(54) TRANSPARENT TOUCH SURFACE KEYBOARD

(75) Inventors: Kun-Tsan Wu, Shindian (TW); Li-Wen Tien, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 344 days.

(21) Appl. No.: 12/960,624

(22) Filed: Dec. 6, 2010

(65) Prior Publication Data

US 2012/0001873 A1  Jan. 5, 2012

(30) Foreign Application Priority Data

Jul. 5, 2010 (CN) .......................... 2010 1 0217647

(51) Int. Cl.
*G06F 3/02* (2006.01)
*G09G 5/00* (2006.01)

(52) U.S. Cl.
USPC ..... 345/168; 345/173; 178/18.01; 178/19.01; 715/773

(58) Field of Classification Search
USPC .................. 345/168–178; 178/18.01–19.07; 715/773

See application file for complete search history.

(56) References Cited

U.S. PATENT DOCUMENTS

| 7,719,826 B1 * | 5/2010 | Chang et al. | 361/679.17 |
| 8,031,174 B2 * | 10/2011 | Hamblin et al. | 345/158 |
| 2005/0225538 A1 * | 10/2005 | Verhaegh | 345/173 |
| 2009/0073128 A1 * | 3/2009 | Marsden | 345/168 |

* cited by examiner

*Primary Examiner* — Michael Pervan
(74) *Attorney, Agent, or Firm* — Altis Law Group, Inc.

(57) ABSTRACT

A transparent touch surface keyboard includes a touch screen, a transparent display screen electronically connected to the touch screen; a central processing unit; and a sensing device. The transparent display screen and the sensing device are electronically connected to the central processing unit. The sensing device senses whether user's hands are above the touch screen and in a position for using the keyboard, and sends control signals to the central processing unit. The central processing unit switches the transparent touch surface keyboard to a working state or a standby state according to the control signals.

17 Claims, 5 Drawing Sheets

TRANSPARENT TOUCH SURFACE KEYBOARD

BACKGROUND

1. Technical Field

The present disclosure generally relates to keyboards using touch surface technology, and particularly to a transparent touch surface keyboard for use with an electronic device.

2. Description of Related Art

Touch surface keyboards have the advantage of providing thinner, lighter input devices and are becoming more widely used. However, touch surface keyboards may consume energy even when not in use.

Therefore, there is room for improvement within the art.

BRIEF DESCRIPTION OF THE DRAWINGS

Many aspects of the present transparent touch surface keyboard can be better understood with reference to the following drawings. The components in the drawings are not necessarily to scale, the emphasis instead being placed upon clearly illustrating the transparent touch surface keyboard. Moreover, in the drawings, like reference numerals designate corresponding parts throughout the several views.

DETAILED DESCRIPTION

Figure 1:
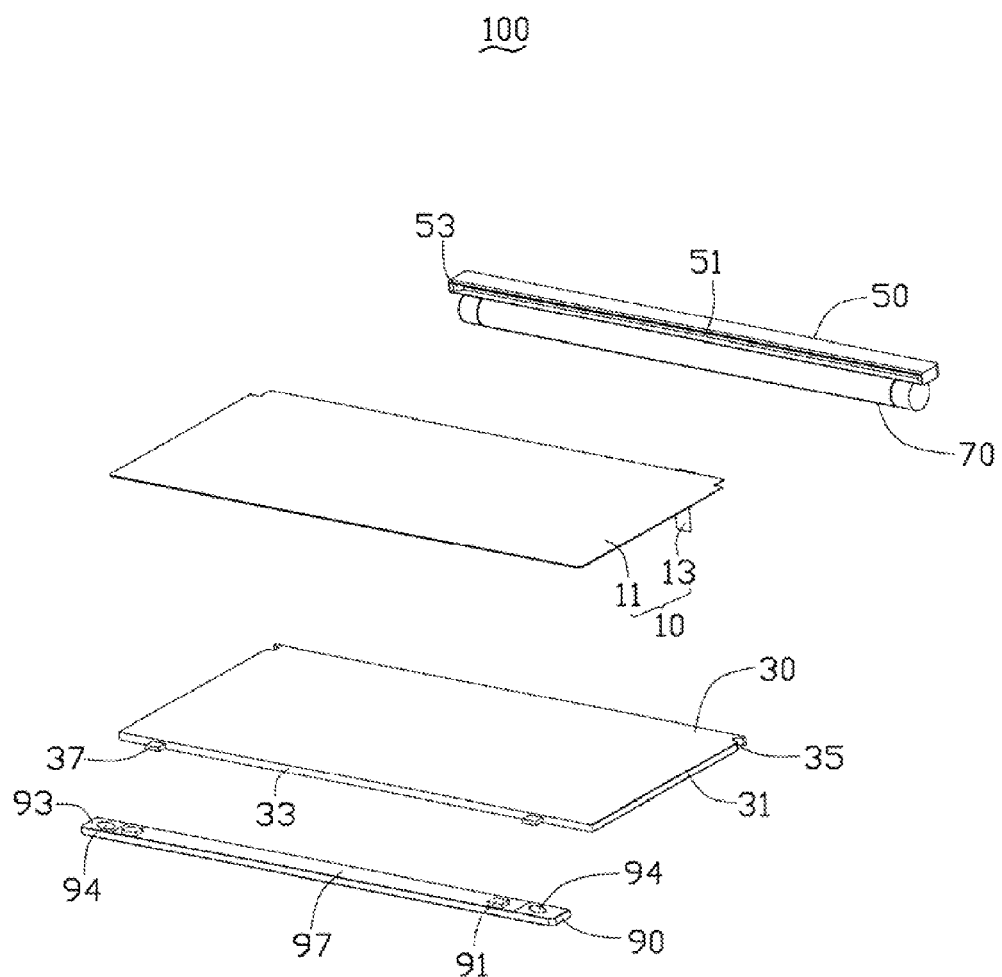
FIG. 1 is an exploded view of a transparent touch surface keyboard according to an exemplary embodiment.

Referring to FIG. 1, a transparent touch surface keyboard 100, according to an exemplary embodiment, includes a touch screen 10, a transparent display screen 30, a fixing member 50, a support member 70 with a built-in control circuit (not shown), and a sensing device 90. The touch screen 10 is located on the transparent display screen 30 and electronically connected to the transparent display screen 30. The fixing member 50 is located on one side of the transparent display screen 30. The support member 70 is located under the fixing member 50. The sensing device 90 is opposite to the fixing member 50 and located along the other side of the transparent display screen 30. The touch screen 10, the transparent display screen 30, and the sensing device 90 are electronically connected to the control circuit.

The touch screen 10 includes a transparent main body 11 and a flexible printed circuit board 13. When a user touches the main body 11, the main body 11 sends touch signals to the control circuit through the flexible printed circuit board 13.

In this exemplary embodiment, the transparent display screen 30 can be a transparent organic light emitting diode display (TOLED) or a transparent field-emission display. The transparent display screen 30 includes two sidewalls 31, and an end wall 33. Each sidewall 31 defines a notch 35. At least one protrusion 37 is located on the end wall 33.

A receiving groove 51 is defined on a sidewall of the fixing member 50. The bottom wall of the fixing member 50 defines a plurality of through holes (not shown). The flexible printed circuit board 13 and wires can be electronically connected to the control circuit through the through holes. Two latch posts 53 corresponding to the notches 35 are located in the receiving groove 51.

At least one latch groove 91 is defined on one sidewall of the sensing device 90. Each latch groove 91 corresponds to a protrusion 37. Also referring to FIG. 3, the sensing device 90 includes a transmitter module 92 for transmitting infrared (IR) light, a plurality of receiver modules 94 for receiving the IR light, and a microprocessor 96. In this exemplary embodiment, the transmitter module 92 is comprised of a plurality of infrared emitting diodes, and the receiver module 94 is an infrared sensor. In the exemplary embodiment, there may be two receiver modules 94. The transmitter module 92 and the receiver modules 94 are electronically connected to the microprocessor 96. Referring to FIG. 1, an optical lens 97 is located on an upper surface 93 of the sensing device 90. The transmitter module 92 is located under the optical lens 97. The two receiver modules 94 opposite to each other are located on the upper surface 93 and adjacent to the optical lens 97. The optical lens 97 separates the receiver modules 94 from each other. The IR light passing through the optical lens 97 is perpendicular to the upper surface 93.

Figure 2:
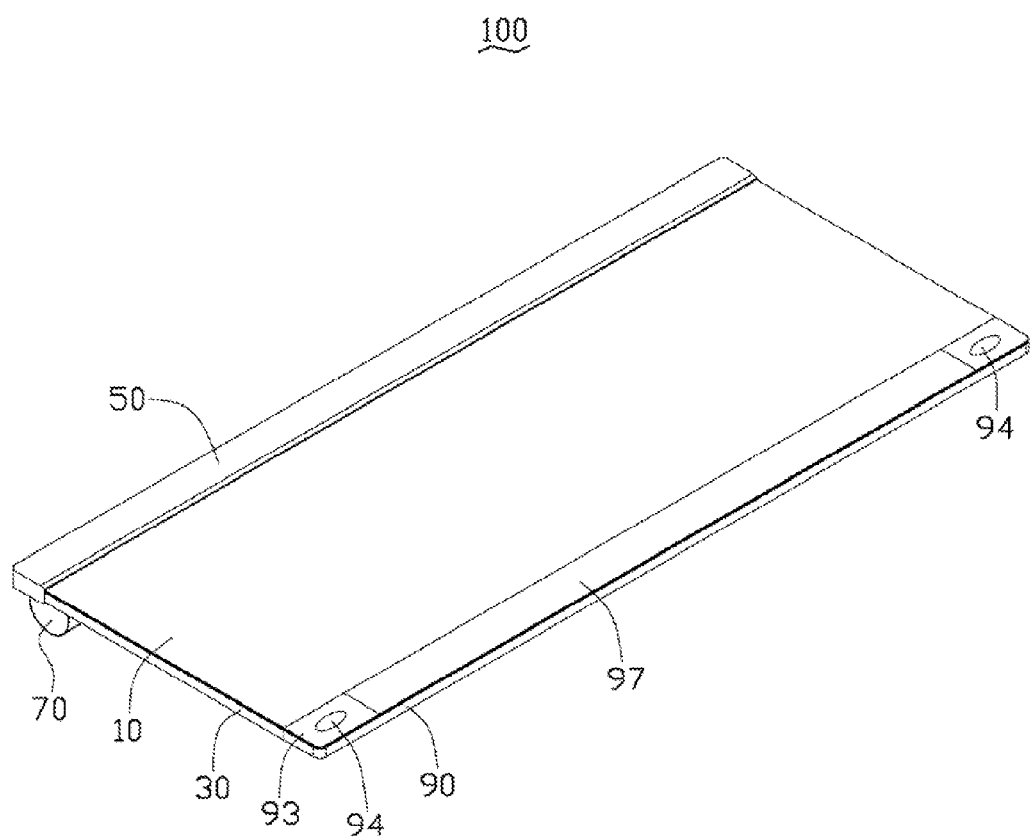
FIG. 2 is a schematic view of the transparent touch surface keyboard shown in FIG. 1.

Referring to FIG. 2, the assembly process of the transparent touch surface keyboard 100 may be as follows: the touch screen 10 is attached to the transparent display screen 30 through optical adhesive (OCA). The latch post 53 is received in the notch 35. And finally, the protrusion 37 is latched in the latch groove 91.

Figure 3:
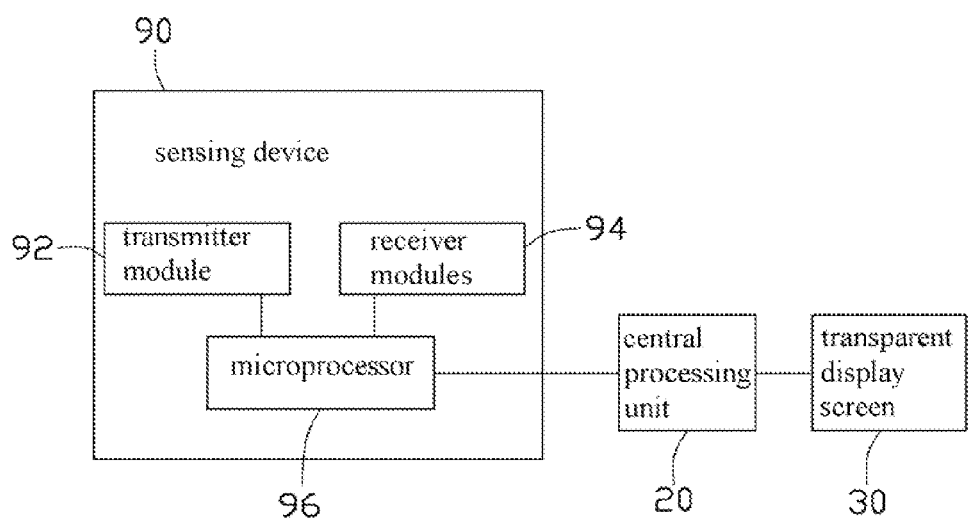
FIG. 3 is a circuit block diagram of the transparent touch surface keyboard shown in FIG. 1.

Referring to FIG. 3, the control circuit in the support member 70 includes a central processing unit 20. The transparent display screen 30 and the microprocessor 96 are electronically connected to the central processing unit 20. The transparent touch surface keyboard 100 has a working state and a standby state. In the working state, the transparent display screen 30 displays key icons. Users input characters to electronic devices such as a computer by touching the appropriate key icons. In the standby state, nothing is displayed on the transparent display screen 30. When the transparent touch surface keyboard 100 is powered on, the transmitter module 92 transmits IR light. The IR light is emitted perpendicular to the upper surface 93 through the optical lens 97.

When a user uses the transparent touch surface keyboard 100 to input characters to an electronic device, at least one hand of the user must pass above the sensing device 90 to be in a position to reach and use the touch screen 10. At least some of the IR light is reflected by the user's hand, and then the receiver module 94 receives the reflected IR light. The microprocessor 96 determines whether the receiver module 94 receives the IR light and sends control signals to the central processing unit 20. The central processing unit 20 switches the transparent touch surface keyboard 100 to the working state or the standby state according to the control signals.

Figure 4A:
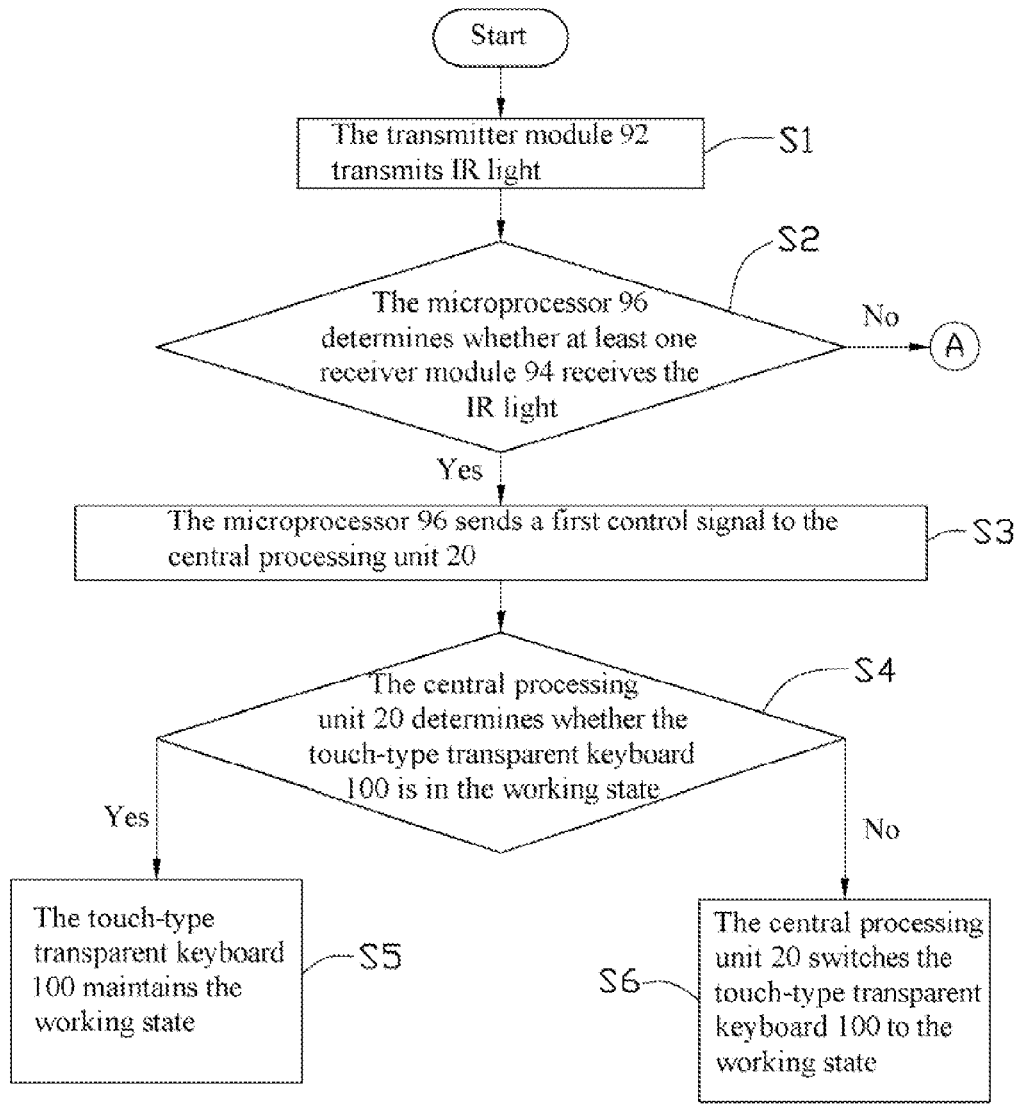
FIGS. 4A-4B are flowcharts illustrating a state transition of the transparent touch surface keyboard shown in FIG. 2.
Figure 4B:
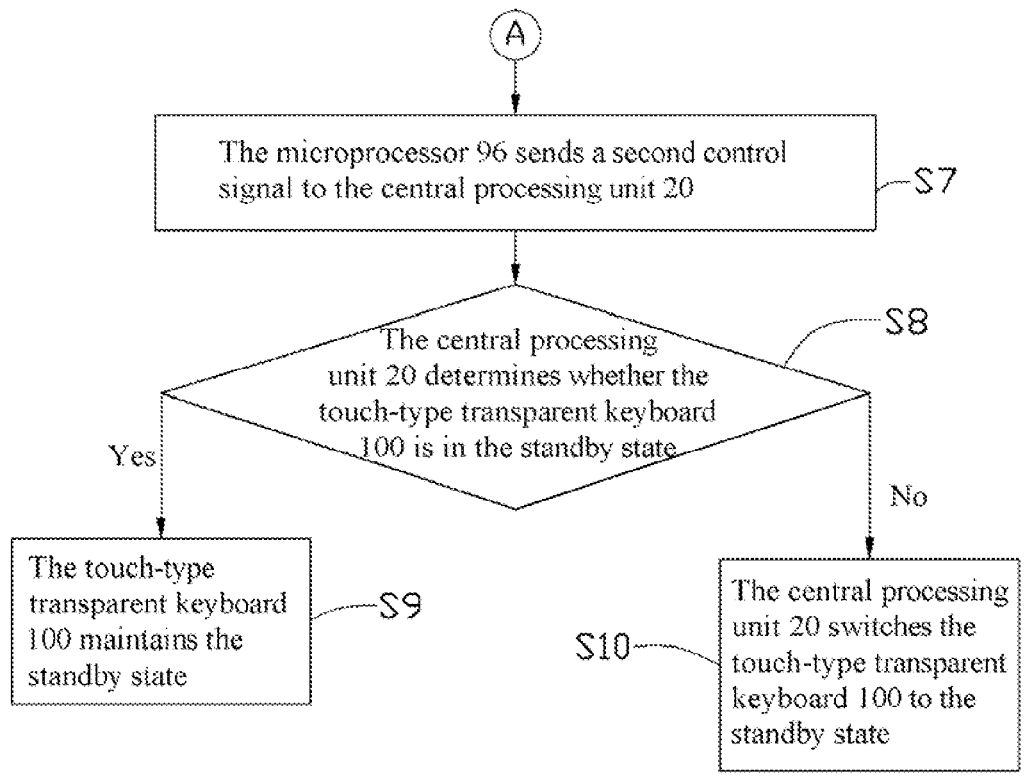

Referring to FIG. 4A and FIG. 4B, the transparent touch surface keyboard 100 functions as follows:

In step S1, the transmitter module 92 transmits IR light under the control of the microprocessor 96.

In step S2, the microprocessor 96 determines whether at least one receiver module 94 receives the IR light. If at least one receiver module 94 receives the IR light, step S3 is implemented. If no receiver module 94 receives the IR light, step S7 is implemented.

In step S3, the microprocessor 96 sends a first control signal to the central processing unit 20.

In step S4, in response to the first control signal, the central processing unit 20 determines whether the transparent touch surface keyboard 100 is in the working state. If the transparent touch surface keyboard 100 is in the working state, step S5 is implemented. If the transparent touch surface keyboard 100 is not in the working state, step S6 is implemented.

In step S5, the transparent touch surface keyboard 100 maintains the working state under the control of the central processing unit 20.

In step S6, the central processing unit 20 switches the transparent touch surface keyboard 100 to the working state.

In step S7, the microprocessor 96 sends a second control signal to the central processing unit 20.

In step S8, in response to the second control signal, the central processing unit 20 determines whether the transparent touch surface keyboard 100 is in the standby state. If the transparent touch surface keyboard 100 is in the standby state, step S9 is implemented. If the transparent touch surface keyboard 100 is not in the standby state, step S10 is implemented.

In step S9, the transparent touch surface keyboard 100 maintains the standby state under the control of the central processing unit 20.

In step S10, the central processing unit 20 switches the transparent touch surface keyboard 100 to the standby state.

The transparent touch surface keyboard 100 senses whether the user's hands are above or on the touch screen through the sensing device 90, and switches between the working state and the standby state accordingly. The electrical energy consumption of the transparent touch surface keyboard 100 is reduced.

In another exemplary embodiment, the optical lens 97 may be omitted, and the transmitter module 92 is sealed in a optical lens.

In another exemplary embodiment, the sensing device 90 is located around the transparent display screen 30.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A transparent touch surface keyboard, comprising:
   a touch screen;
   a transparent display screen electronically connected to the touch screen, the transparent display screen comprising an end wall, a protrusion located on the end wall;
   a central processing unit; and
   a sensing device located on the end wall and being coplanar with the transparent display screen, the sensing device defining a latch groove at one side;
   wherein the protrusion is latched in the latch groove; the transparent display screen and the sensing device are electronically connected to the central processing unit; the sensing device senses whether a user's hand passes above the sensing device to be in a position above the touch screen for using the keyboard, and sends control signals to the central processing unit; the central processing unit switches the transparent touch surface keyboard in a working state or a standby state according to the control signals.

2. The transparent touch surface keyboard as claimed in claim 1, wherein the sensing device comprises a transmitter module for transmitting infrared (IR) light, a plurality of receiver modules for receiving the IR light, and a microprocessor electronically connected to the central processing unit; the transmitter module and the plurality of receiver modules are electronically connected to the microprocessor.

3. The transparent touch surface keyboard as claimed in claim 2, wherein an optical lens is located on an upper surface of the sensing device; the transmitter module is located under the optical lens, the IR light passing through the optical lens is perpendicular to the upper surface; the plurality of receiver modules are located on the upper surface and adjacent to the optical lens.

4. The transparent touch surface keyboard as claimed in claim 3, wherein when at least one receiver module receives the IR light, the microprocessor sends a first control signal to the central processing unit, the central processing unit switches the transparent touch surface keyboard to the working state according to the first control signal, and the transparent display screen displays key icons in the working state.

5. The transparent touch surface keyboard as claimed in claim 4, wherein when the plurality of receiver module do not receive the IR light, the microprocessor sends a second control signal to the central processing unit, the central processing unit switches the transparent touch surface keyboard to the standby state according to the second control signal, and nothing is displayed on the transparent display screen in the standby state.

6. The transparent touch surface keyboard as claimed in claim 5, wherein the transmitter module is comprised of a plurality of infrared emitting diodes, and the receiver module is an infrared sensor.

7. The transparent touch surface keyboard as claimed in claim 5, wherein the transparent display screen is a transparent organic light emitting diode display or a transparent field-emission display.

8. The transparent touch surface keyboard as claimed in claim 5, wherein the transparent touch surface keyboard further comprises a fixing member located on one side of the transparent display screen, the sensing device is opposite to the fixing member and located along the other side of the transparent display screen.

9. The transparent touch surface keyboard as claimed in claim 8, wherein the transparent touch surface keyboard further comprises a support member at least partially containing a built-in control circuit, the support member is located under the fixing member, the control circuit comprises the central processing unit.

10. The transparent touch surface keyboard as claimed in claim 9, wherein the transparent display screen comprises two sidewalls opposite to each other, each sidewall defines a notch; a receiving groove is defined on a sidewall of the fixing member, two latch posts are located in the receiving groove and individually received in the notches.

11. A transparent touch surface keyboard, comprising:
    a touch screen;
    a transparent display screen electronically connected to the touch screen, the transparent display screen comprising an end wall, a protrusion located on the end wall;
    a central processing unit; and
    a sensing device located on the end wall and being coplanar with the transparent display screen, the sensing device defining a latch groove at one side;
    wherein the protrusion is latched in the latch groove; the transparent display screen and the sensing device are electronically connected to the central processing unit; the sensing device senses whether a user's hand passes above the sensing device to be in a position above the touch screen for using the keyboard, and sends control signals to the central processing unit; the central processing unit switches the transparent display screen to display key icons or nothing according to the control signals.

12. The transparent touch surface keyboard as claimed in claim 11, wherein the sensing device comprises a transmitter module for transmitting infrared (IR) light, a plurality of receiver modules for receiving the IR light, and a microprocessor electronically connected to the central processing unit; the transmitter module and the plurality of receiver modules are electronically connected to the microprocessor.

13. The transparent touch surface keyboard as claimed in claim 12, wherein an optical lens is located on an upper surface of the sensing device; the transmitter module is located under the optical lens, the IR light passing through the optical lens is perpendicular to the upper surface; the plurality of receiver modules are located on the upper surface and adjacent to the optical lens.

14. The transparent touch surface keyboard as claimed in claim 13, wherein when at least one receiver module receives the IR light, the microprocessor sends a first control signal to the central processing unit, the central processing unit switches the transparent display screen to display key icons according to the first control signal.

15. The transparent touch surface keyboard as claimed in claim 14, wherein when the plurality of receiver module do not receive the IR light, the microprocessor sends a second control signal to the central processing unit, the central processing unit switches the transparent display screen to display nothing according to the second control signal.

16. The transparent touch surface keyboard as claimed in claim 15, wherein the transmitter module is comprised of a plurality of infrared emitting diodes, and the receiver module is an infrared sensor.

17. The transparent touch surface keyboard as claimed in claim 15, wherein the transparent display screen is a transparent organic light emitting diode display or a transparent field-emission display.

\* \* \* \* \*